(12) United States Patent
Frank et al.

(10) Patent No.: US 7,946,104 B2
(45) Date of Patent: May 24, 2011

(54) BLEED AIR RELIEF SYSTEM FOR ENGINES

(75) Inventors: Joel H. Frank, San Diego, CA (US); Gabriel N. Torres, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1240 days.

(21) Appl. No.: 11/433,300

(22) Filed: May 12, 2006

(65) Prior Publication Data
US 2007/0261410 A1 Nov. 15, 2007

(51) Int. Cl.
*F02C 6/18* (2006.01)

(52) U.S. Cl. .......................... 60/226.1; 60/785

(58) Field of Classification Search ............ 60/782, 60/785, 226.1, 226.2
See application file for complete search history.

(56) References Cited

U.S. PATENT DOCUMENTS

| | | | | |
|---|---|---|---|---|
| 2,633,908 A * | 4/1953 | Brierly | ............ | 239/423 |
| 3,487,993 A * | 1/1970 | Rannenberg | ............ | 60/785 |
| 3,799,045 A | 3/1974 | Sohlberg | | |
| 4,537,277 A * | 8/1985 | Bryce | ............ | 181/214 |
| 4,844,689 A | 7/1989 | Seed | | |
| 5,054,281 A | 10/1991 | Mutch | | |
| 5,155,991 A | 10/1992 | Bruun | | |
| 5,261,228 A | 11/1993 | Shuba | | |
| 5,279,109 A * | 1/1994 | Liu et al. | ............ | 60/785 |
| 5,380,151 A | 1/1995 | Kostka et al. | | |
| 5,490,629 A | 2/1996 | Bonniot et al. | | |
| 5,540,252 A * | 7/1996 | Bruun | ............ | 137/220 |
| 5,845,482 A | 12/1998 | Carscallen | | |
| 6,048,171 A | 4/2000 | Donnelly et al. | | |
| 6,446,657 B1 | 9/2002 | Dziorny et al. | | |
| 6,565,313 B2 * | 5/2003 | Nikkanen et al. | ............ | 415/144 |
| 6,588,195 B2 | 7/2003 | Negulescu | | |
| 6,622,475 B2 | 9/2003 | Brault et al. | | |
| 6,887,147 B2 | 5/2005 | Thomassin et al. | | |
| 6,899,513 B2 | 5/2005 | Eleftheriou | | |
| 6,981,842 B2 * | 1/2006 | D'Angelo et al. | ............ | 415/144 |
| 2005/0229586 A1 | 10/2005 | Whurr | | |
| 2006/0005546 A1 | 1/2006 | Orlando et al. | | |
| 2006/0273203 A1 * | 12/2006 | Denzler | ............ | 239/428.5 |
| 2007/0066212 A1 * | 3/2007 | Klingler et al. | ............ | 454/155 |

FOREIGN PATENT DOCUMENTS

WO  WO9605438  2/1996

* cited by examiner

*Primary Examiner* — Ted Kim

(74) *Attorney, Agent, or Firm* — Womble Carlyle Sandridge & Rice, PLLC

(57) ABSTRACT

A bleed air relief system for engines in which a flow of bleed air from the engine compressor is passed along a bleed air duct and exhausted into a bypass air stream passing through the engine. A cover is mounted over the outlet of the bleed air duct and can include flow passages and a diffuser for controlling the flow of bleed air being exhausted to enhance mixing of the bleed air with the bypass air stream.

12 Claims, 9 Drawing Sheets

# BLEED AIR RELIEF SYSTEM FOR ENGINES

FIELD OF THE INVENTION

The present invention generally relates to a bleed air relief system for engines, and in particular to a diffuser nozzle and/or blanking device for a bleed air relief system cover for control of the introduction of bleed air from an engine compressor into the bypass airflow of an aircraft high bypass gas turbine engine.

BACKGROUND OF THE INVENTION

Bypass engines, such as jet turbine engines for aircraft, generally include a bleed air relief system for venting heated air from the engine compressor to the bypass air duct of the engine. Bleed air relief generally is provided to prevent the compressor from exceeding its surge limits during operation. Excess compressed air is bled off from the compressor upstream of the point at which the compressed air is mixed with fuel in the combustor section of the engine. Such bleed air relief systems typically include a bleed relief valve positioned along an air duct for controlling the release of bleed air from the compressor into the bypass air stream. The bleed air coming from the compressor generally is at a high pressure and temperature, typically upwards of approximately 950° F.-1,300° F., and often routed from the bypass air duct for deicing, pressurizing the cabin of an aircraft, operation of pneumatic actuators, and a variety of other applications.

The high temperature of the bleed air from the compressor can, when injected into the bypass air stream, cause damage to the walls of the bypass duct, translating sleeve, and cascades of the thrust reversers, and translating cowl portions of the engine, especially under conditions of prolonged exposure during thrust reverse operations of the engine. It is now known to utilize a perforated cover at the outlet of the bleed relief duct along the bypass duct of the engine to induce mixing of the bleed air with the bypass air for cooling of the bleed air prior to it impinging upon the walls of the bypass duct, translating sleeve, cascades, and other components of the engine. However, the heat reduction effect provided by such conventional perforated covers can be somewhat limited under certain high pressure and/or high velocity flow conditions.

One condition in which the heat reduction effectiveness of conventional perforated covers is lessened is where the bleed valve is in a failed open state. In this condition, the bleed valve that normally regulates the amount of air bled from the compressor can become stuck in the "open" position, thereby continuously injecting high pressure bleed air at temperatures of 950° F.-1,300° F. or greater into the bypass duct. The prolonged effect of high temperature bleed air can have a undesirable effect upon the several components encountered. Such temperatures can be higher than the curing temperatures of adhesives used in the construction of components such as the cascade translating sleeve, thereby leading to potential cracks and even failures. Similarly, in a forward mode operation of the aircraft, exposure of the translating cowl or inner walls of the bypass duct and other portions of the engine to such high temperature bleed air for several hours during flight can cause some damage or discoloration, such as scorching, cracks, delamination, dis-bonding and eventually failures of such components. If not corrected in a timely manner, eventual repair or replacement of engine components, e.g., translating cowl, may be required.

Accordingly, it can be seen that a need exists for a bleed air relief system that addresses the foregoing and other related and unrelated problems in the art.

SUMMARY OF THE INVENTION

Briefly described, the present invention is directed to a bleed air relief system for engines. The system of the present invention is designed to enhance the mixing of bleed air from the engine compressor with a bypass air stream passing through a bypass air duct to reduce the temperature of the bleed air at an enhanced rate.

The bleed air relief system generally comprises a bleed air duct extending between an inlet at the engine compressor and an outlet located along the bypass duct, along which the bleed air is vented from the compressor. A bleed air valve is positioned along the bleed air duct for regulating passage of a flow of bleed air released from the engine compressor to the outlet of the bleed air duct. A cover is mounted over the outlet of the bypass duct, and includes an upper surface having a plurality of flow passages formed therethrough.

A diffuser is located ahead of the cover exit in a position to control the flow of bleed air. As the flow of bleed air passes through the flow passages and merges with the air exiting the diffuser, a shear layer is created between the flow passage and the diffuser nozzle. As a result, the velocity of at least a portion of the bleed air passing through the upper surface of the cover is changed to enhance mixing of the bleed air with the bypass air and accordingly reduce the temperature of the bleed air.

Various objects, features, and advantages of the present invention will become apparent to those skilled in the art upon a review of the following detailed description when taken in conjunction with the accompanying drawings.

DETAILED DESCRIPTION OF THE INVENTION

Figure 1:
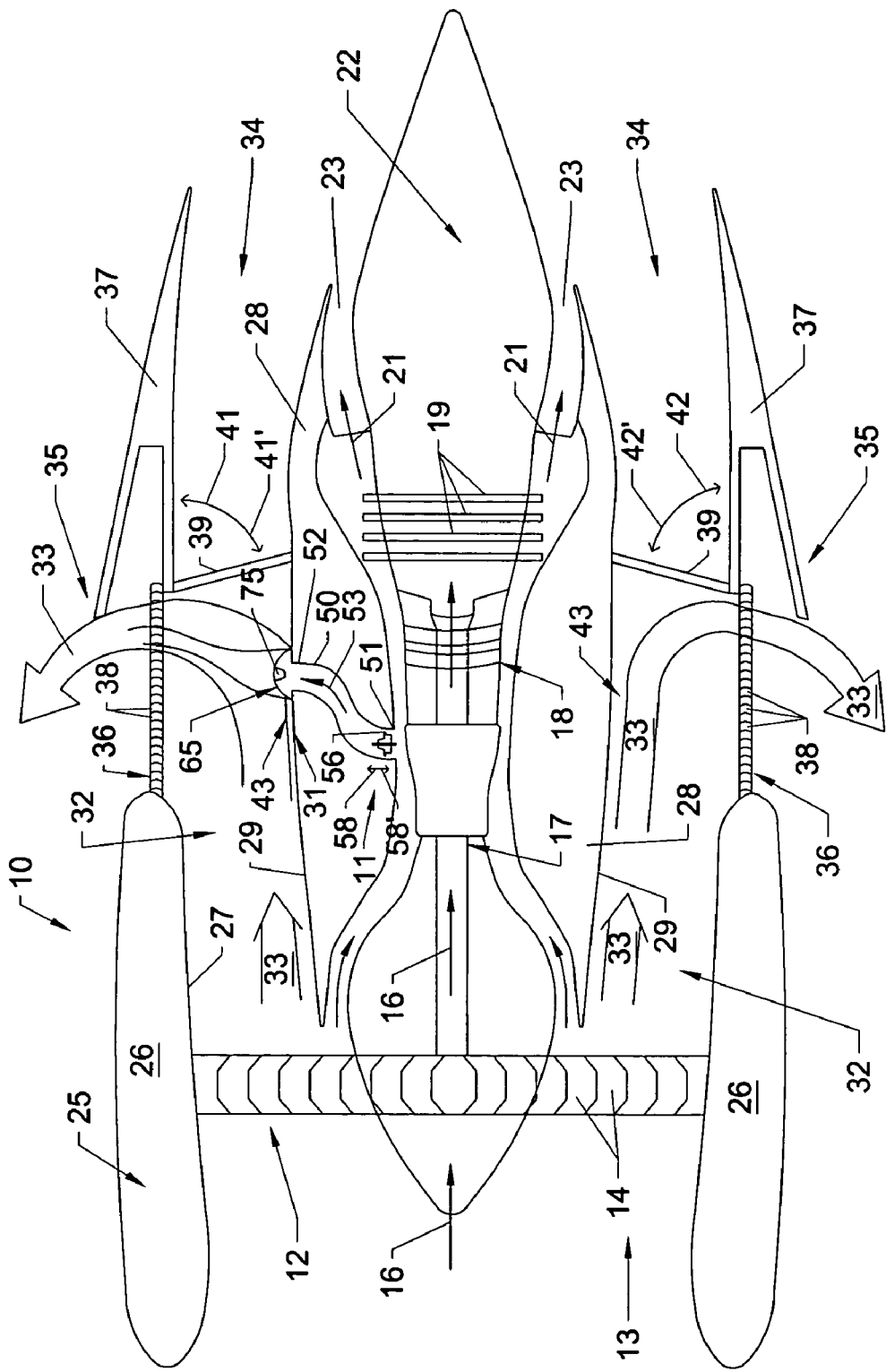
FIG. 1 is a schematic cross-sectional view of an engine incorporating a bleed air relief system of the present invention.

Referring now in greater detail to the drawings in which like numerals indicate like parts throughout the several views, FIG. 1 generally illustrates an engine 10 incorporating a bleed air relief system 11 according to the principles of the present invention. For purposes of illustration, the bleed air relief system 11 of the present invention has been illustrated for use with a high bypass engine 10, such as a turbo-fan jet engine for aircraft, although it will be understood by those skilled in the art that the bleed air relief system of the present invention can be incorporated into and used with various other types of engines in a variety of different applications. An example of turbo-fan jet engines for which the present invention may have particular applicability include the Rolls Royce Trent® 1000 family of engines, as well General Electric aircraft engines, including its new GEnx® (General Electric Next Generation engines).

As generally illustrated in FIG. 1, the engine 10 typically will include a fan 12 positioned at an upstream or inlet end 13 of the engine 10, and including a series of fan blades 14 that are rotated so as to draw a flow of air into the inlet 13 of the engine, as indicated by arrow 16. The inlet air accelerated by the fan blades, and a portion of the inlet air is directed into and through a compressor 17 that compresses the flow of air 16 and injects the compressed air into a combustor 18 where the air is mixed with a spray of fuel and ignited/combusted. The combustion of the fuel/air mixture in the combustor 18 in turn drives a series of turbines 19 located downstream from the combustor 18 to provide power to the engine. Exhaust gases resulting from the combustion of the inlet air/fuel mixture are exhausted, as indicated by arrows 21, through a nozzle section 22 at the outlet or rear end 23 of the engine 10.

Figure 2:
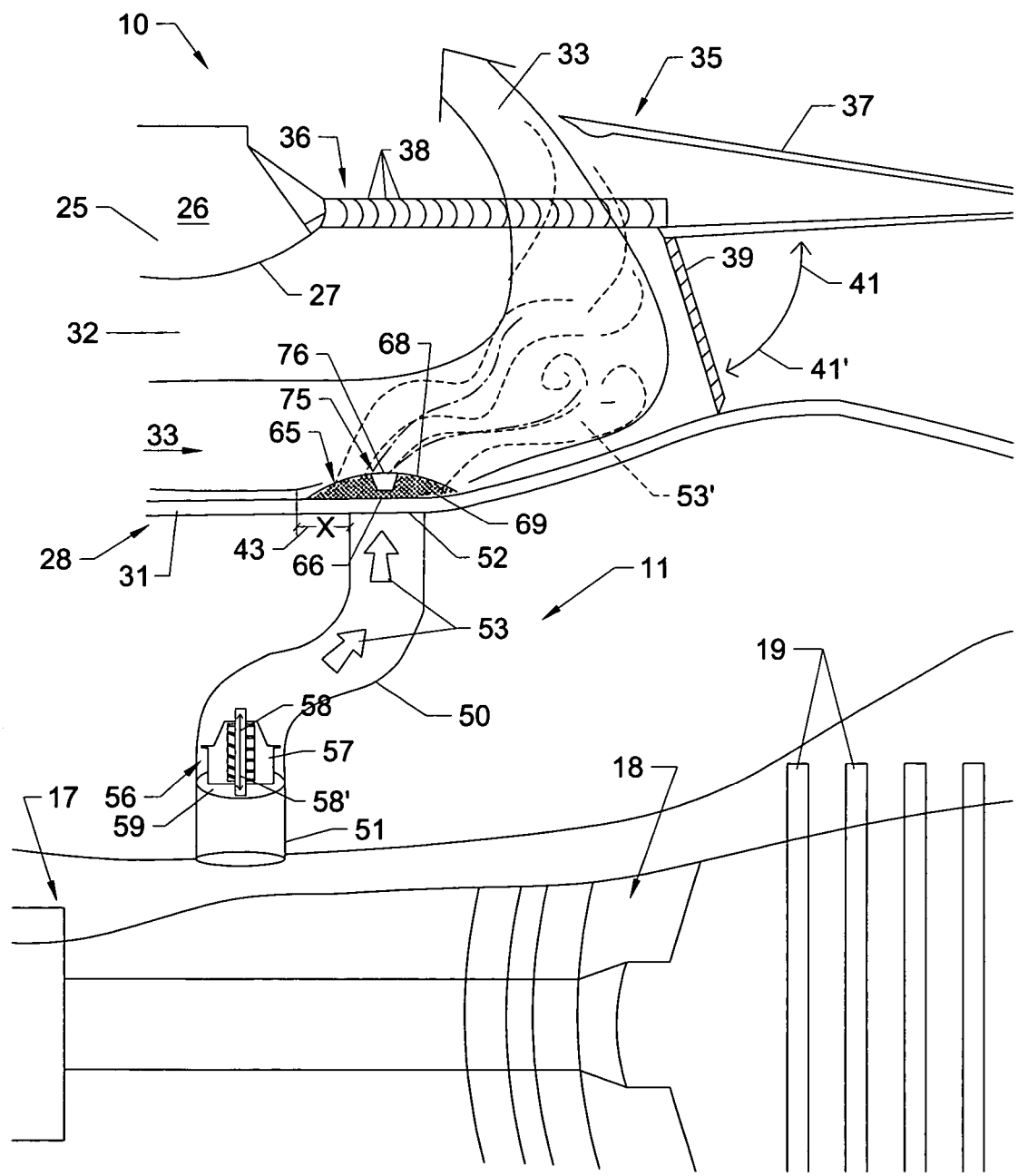
FIG. 2 is a side elevational view, taken in partial cross section, illustrating a bleed air relief system, including the bleed relief cover with a divergent nozzle, according to the principles of the present invention.

The operative components of the engine 10, including the compressor 17, combustor 18, turbines 19 and nozzle section 22, generally are contained within a housing or nacelle 25. The nacelle 25 can include an inlet cowl 26, including a fan cowl portion and having an inner-wall 27, and a core cowl or housing 28 that extends over and protects the compressor, combustor, and turbines, as indicated in FIG. 1. As illustrated in FIGS. 1 and 2, the outer wall 29 of the core cowl or housing 28 forms an inner fixed structure ("IFS") 31 that together with the inner wall 27 of the inlet cowl 26 of the nacelle, defines a bypass duct or passage 32 along which bypass air streams, indicated by arrows 33, are drawn into and through the engine by the fan blades. Air streams 33 are diverted from passing through the compressor, combustor and turbines, and instead are directed along a bypass path toward an outlet 34.

A thrust reverser structure 35 (FIG. 1) is positioned downstream from the inlet cowl 26 and typically, but not necessarily, includes cascades 36 extending from a rear portion or bull nose fairing of the nacelle structure 25 to a translating sleeve or cowl 37 at the outlet end of the engine. Blocker doors 39 are provided adjacent the translating sleeves 37 along the rear edges of the cascades 36. The blocker doors are pivotable between raised and lowered positions, as indicated by arrows 41/41' and 42/42' in FIG. 1 during forward and reverse thrust operations of the engine 10. As indicated in FIGS. 1 and 2, in their lowered position during a reverse thrust operation, the blocker doors 39 block the forward passage of the bypass air streams, indicated by arrows 33, through the engine to the outlet 23. As a result, an adverse pressure gradient is created along the outer wall or IFS. Additionally, the fan duct geometric area rule rapidly expands during a reverse thrust operation, and since the air flow generally cannot make a sharp 80°-90° turn in the corner between the IFS and blocker door, a separation of the air streams from the outer wall 29 of the core cowl 28 is created at an IFS flow separation point indicated by 43 in FIGS. 1 and 2. The bypass air streams are redirected through the cascades to thus reverse the thrust of the engine.

Each of the cascades 36 generally is formed with a series of passages or openings 38 extending therethrough to enable the air flowing through the bypass ducts 32 to be diverted and passed therethrough during a reverse thrust operation of the engine. Typically, the cascades will be formed from carbon composite fiber plies. However, the typical temperature limits of such carbon fiber cascades are about 300° F.-320° F. Using cascade materials that can exceed 320° F. can become prohibitively expensive and often require long lead times for use.

In a conventional bleed air system, hot bleed air from the compressor is diverted to the bypass duct 32, thereby introducing bleed air from the compressor into the bypass air stream. This bleed air impinges upon the cascades during reverse thrust operations of the engine. However, with the present invention, it is believed that it may be possible to use lighter weight, off-the-shelf, heat resistant materials rated up to 320° F., such as various composite or synthetic materials, due to the reduction in temperature of the bleed air prior to its impinging upon the cascade that is provided by the bleed air relief system of the present invention.

As generally illustrated in FIGS. 1 and 2, a bleed air relief system 11 generally can include a bleed air duct 50 that extends through the core cowl from an inlet end 51, upwardly through the cowl to an outlet end 52 located along the outer wall of the core cowl 28 (inner fixed structure 31) adjacent the IFS flow separation point 43. The bleed air duct 50 can include a pipe, tube or similar ductwork that may be formed from a high strength, high temperature resistant material and receives a flow of bleed air, indicated by arrows 53 from the compressor 17, through the inlet end 51 of the bleed air duct. The bleed air flow is directed along the bleed air duct to the outlet end 52 thereof where the bleed air is exhausted into the stream of bypass air indicated by arrow 33 passing through a bypass duct 32.

As illustrated in FIG. 2, a bleed air valve 56 generally can be mounted within the bleed air duct 50, with the bleed air valve 56 typically being mounted close or proximate to the inlet end 51 of the bleed air duct 50, although its position along the bleed air duct 50 can be varied as needed or desired. The bleed air valve 56 typically can be a conventional bleed air valve having a valve body 57 biased toward a closed position, as indicated by arrow 58 toward engagement with a valve seat for maintaining the valve in a closed position to restrict the flow of bleed air through the bleed air duct 50. As the surge pressure behind the flow of bleed air being directed into the bleed air duct 50 from the compressor 17 exceeds a predetermined level, the bleed valve 56 will be moved to an open position as indicated by arrows 58', opening the valve 56 and thus enabling passage of a flow of bleed air into and along the bleed air duct 50 for exhausting the flow of bleed air through the outlet 52 of the bleed air duct 50. Once the surge pressure behind the flow of bleed air being bled off the compressor drops below the threshold or predetermined level set for the bleed valve 56, the bleed valve 56 can then close to shut off the flow of bleed air through the bleed air duct 50.

It further will be understood, however, that under extreme conditions, the bleed air valve 56 can become blocked or jammed in a fully opened position, so as to be "failed open." In such a failed open state, a substantially continuous flow of bleed air from the compressor 17 is enabled to pass through the valve 56 and thus through the bleed air duct 50. This can result in an increased bleed flow velocity and mass flow, as well as increased flow temperature of the bleed air through the bleed air duct 50 and into the bypass air stream 33, with such a high velocity flow of bleed air passing through the bypass air stream without substantially mixing with the bypass air prior to impinging upon the cascades, translating sleeve, or bypass duct walls. The present invention enhances mixing and reduces the temperature of the bleed air impinging upon the cascades, even under conditions such as when the bleed air valve is in a failed open state.

Figure 3:
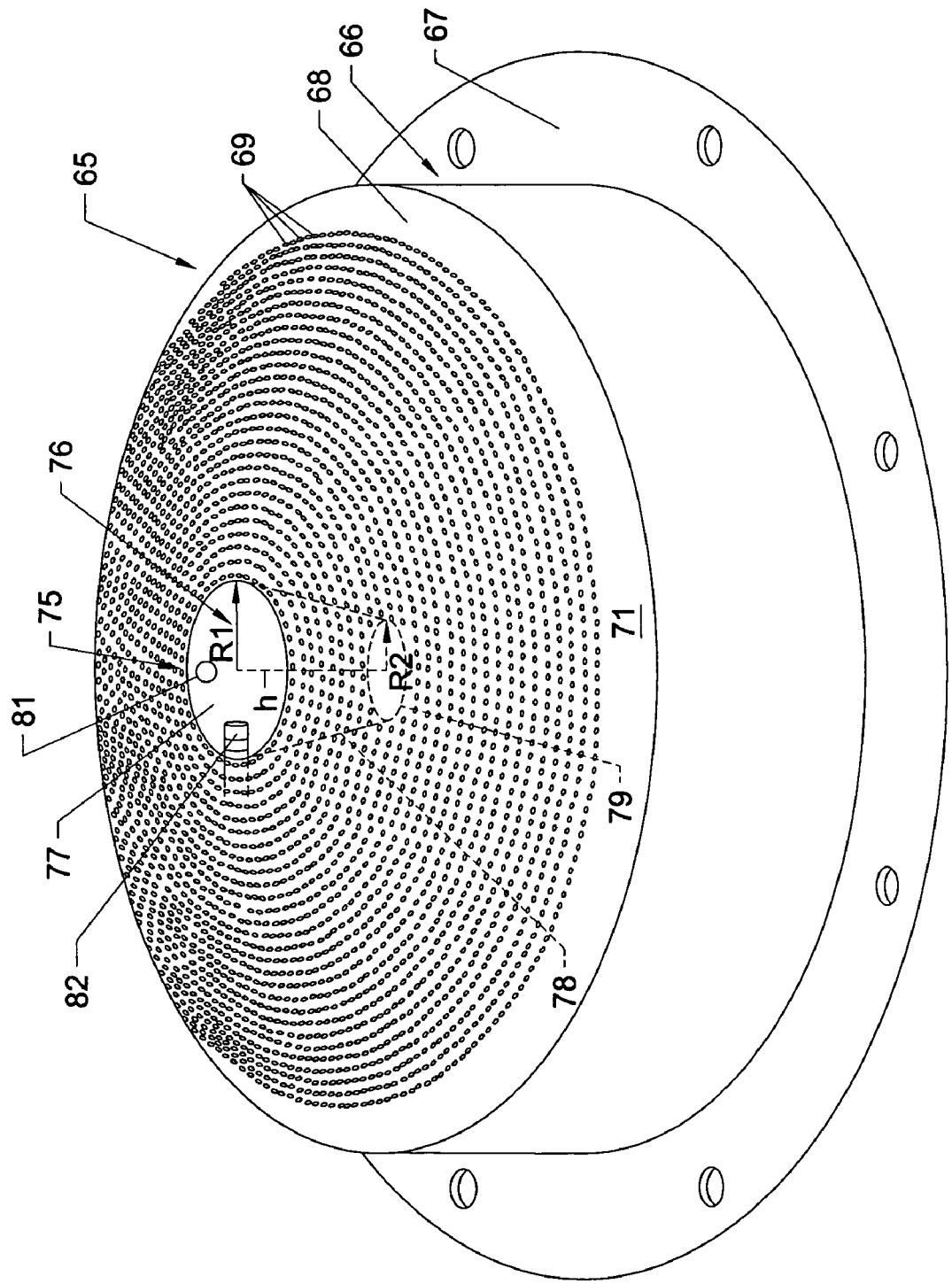
FIG. 3 is a perspective illustration of an example embodiment of the cover of the bleed air relief system according to the principles of the present invention.
Figure 4A:
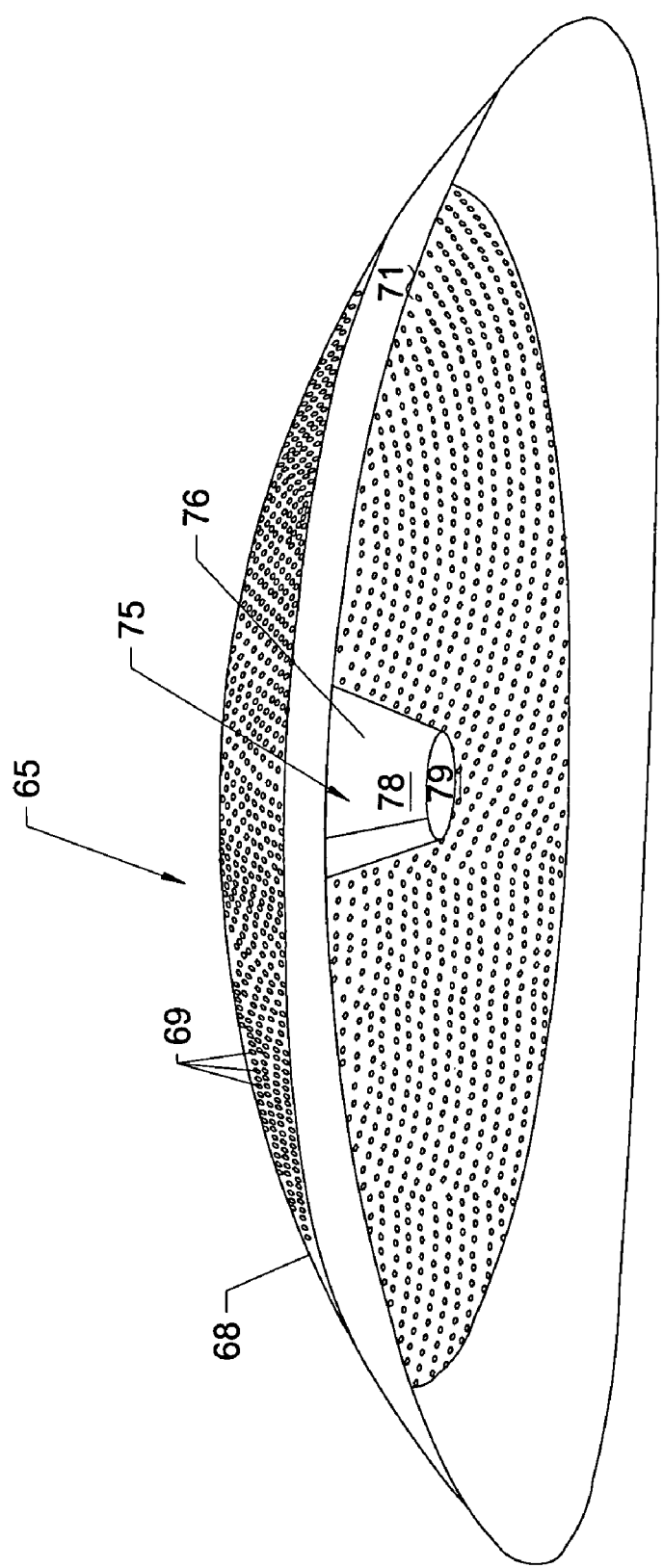
FIGS. 4A and 4B are perspective illustrations of embodiments of the divergent nozzle and upper surface portion of the cover of FIG. 3.
Figure 4B:
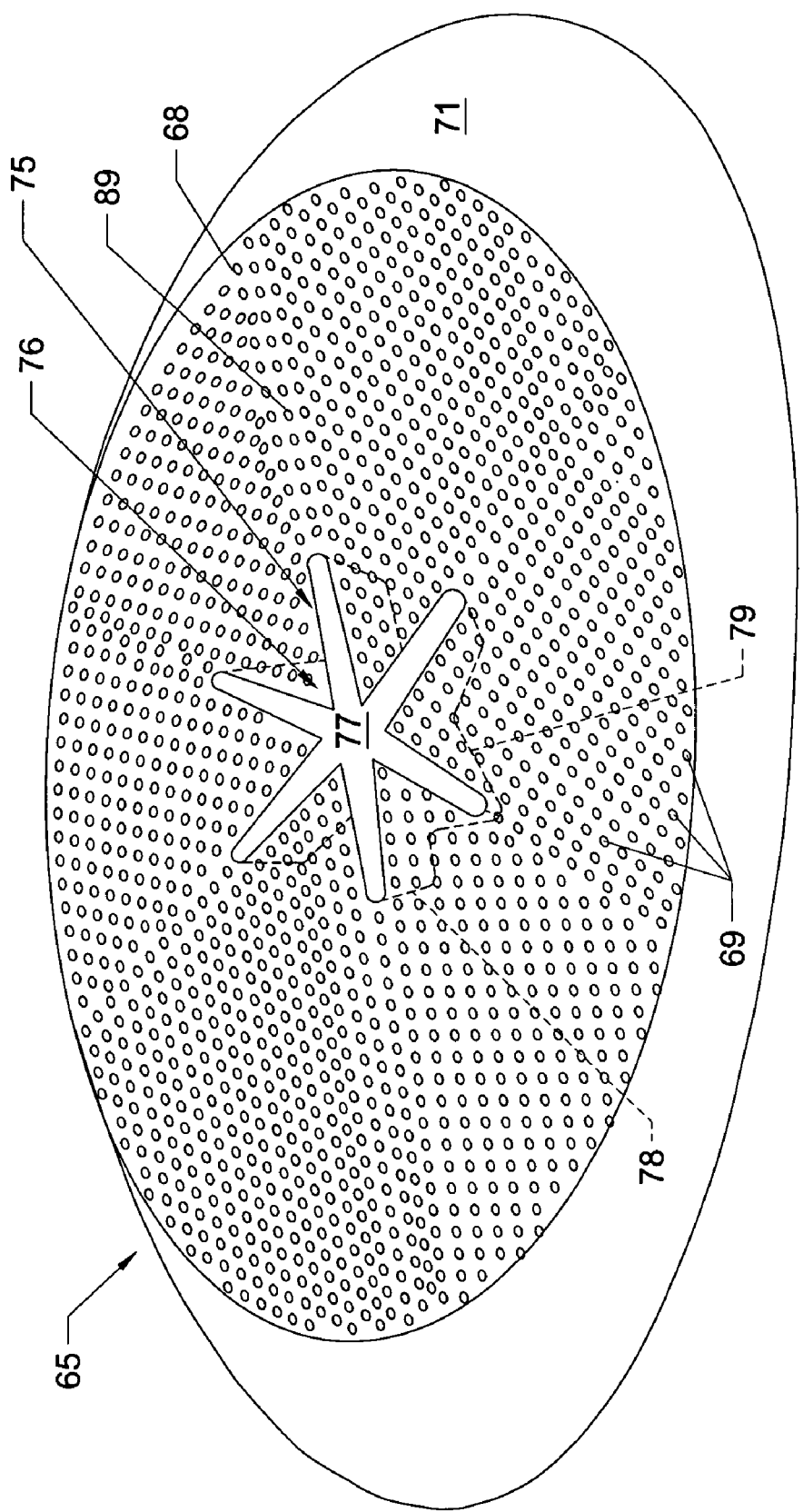
Figure 5A:
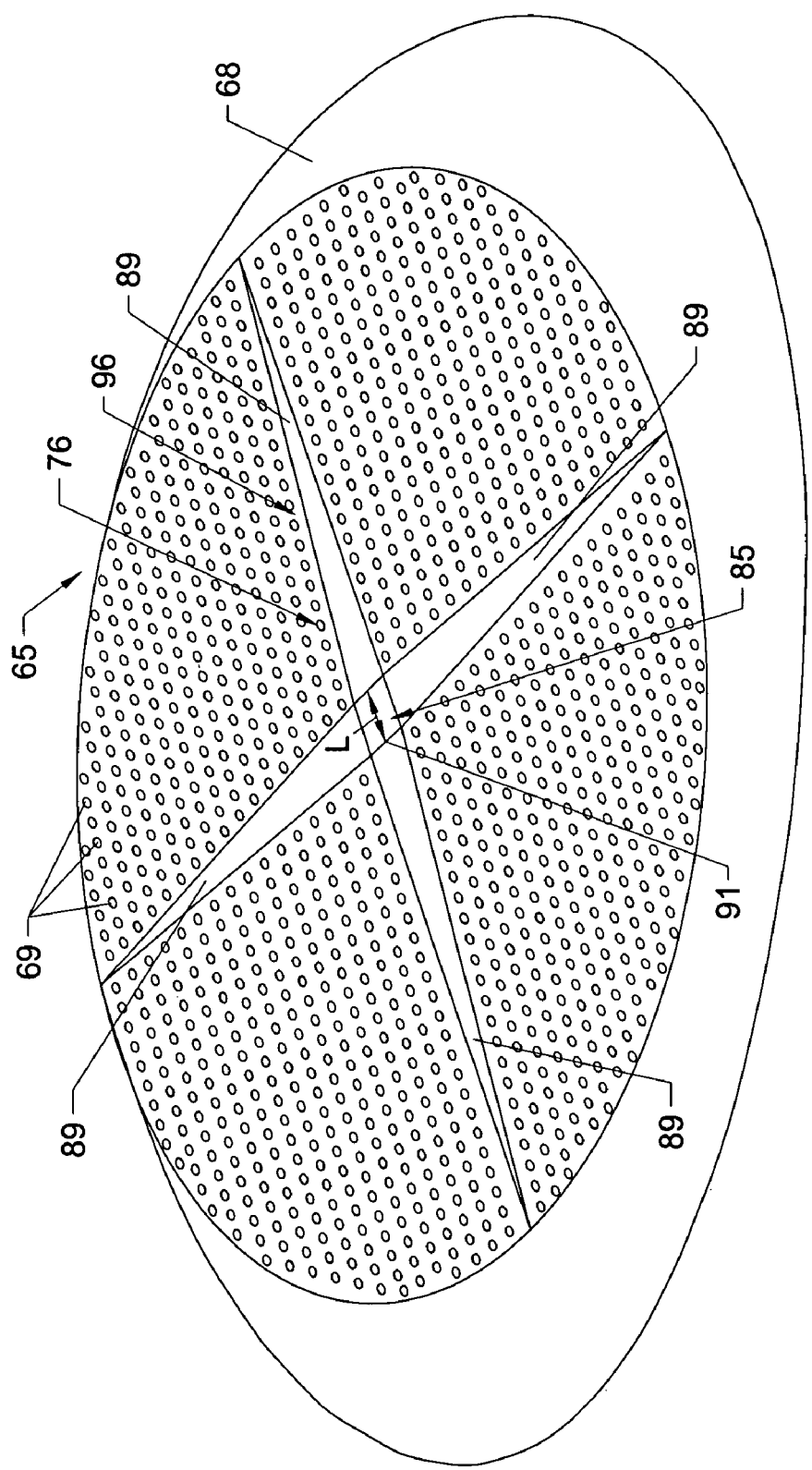
FIGS. 5A-5B are perspective illustrations of additional embodiments of the bleed air relief cover of the present invention incorporating various blockage patterns.
Figure 5B:
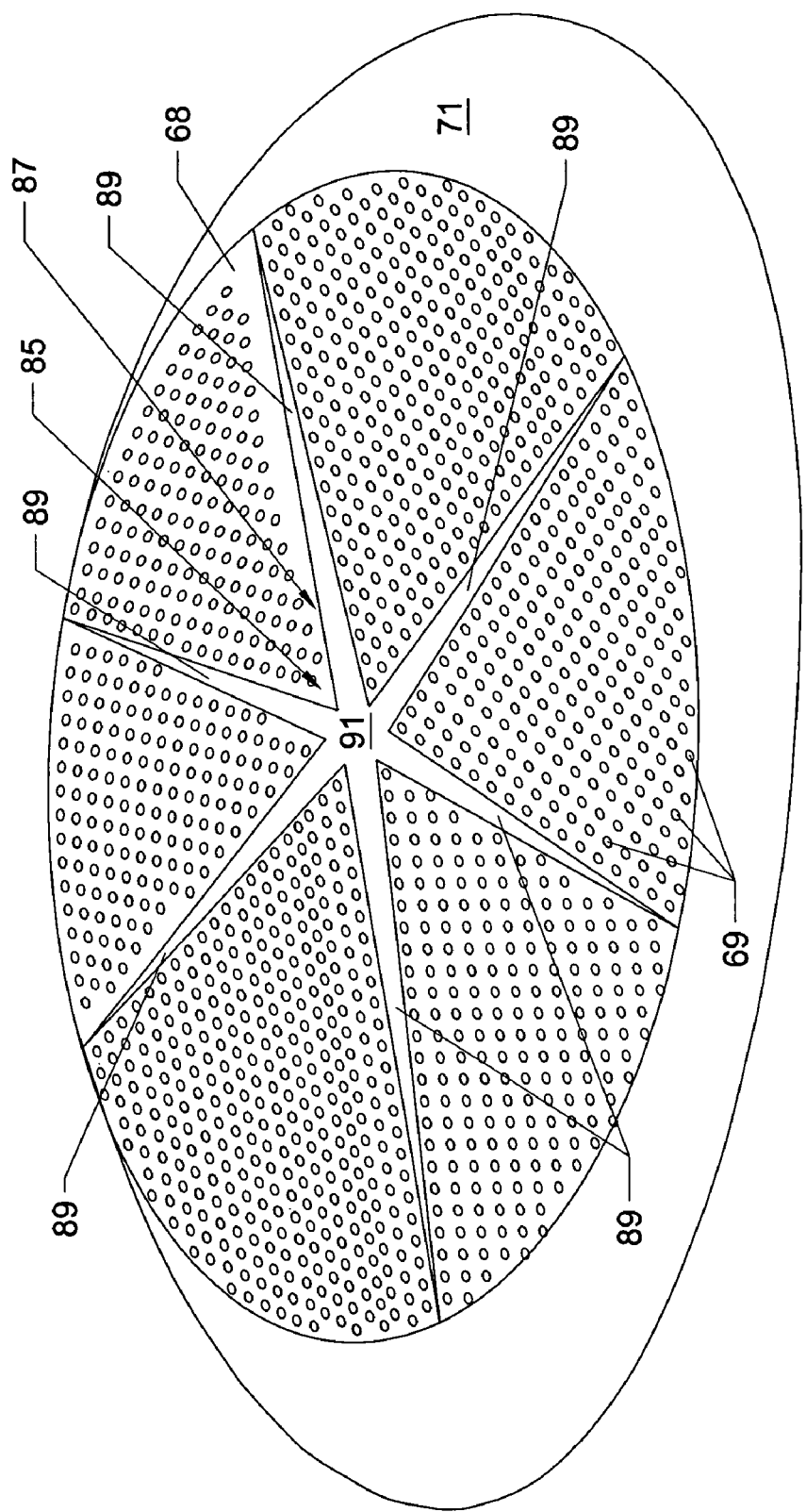

As shown in FIGS. 2 and 3, a cover 65 can be mounted over the outlet end 52 of the bleed air duct 50 to help enhance mixing of the high temperature bleed air 53 and the low temperature (relatively speaking) bypass air stream 33. Such enhanced mixing of these two air streams prevents the hot bleed air from directly contacting the cascade 36 and its vanes 38.

The cover 65 generally can include a body 66, typically formed from a durable, high strength, high temperature resistant material such as steel or other metals or metal alloys, or can include various composite materials. The cover body 66 is shown in FIG. 3 as having a substantially cylindrical shape with a base portion 67 and a domed or convex surface 68. It will, however, be understood that the body 66 can be formed with various other configurations or shapes (i.e., substantially square or box-shaped, hat-shaped, etc.) and with the upper surface 68 thereof having varying degrees of curvature. As further illustrated in FIGS. 3-6, the upper surface 68 of the cover 65 further typically can be porous, including a series of perforations or flow passages 69 therethrough, surrounded by an outer peripheral edge or bald patch 71, through which air is unable to flow. As the bleed air exits the outlet 52 (FIG. 2) of the bleed air duct 50 and passes through the perforations 69 of the cover 65, the bleed air tends to be disrupted or diffused as indicated by dashed lines 53' in FIG. 2, so as to facilitate mixing of the bleed air with the lower temperature bypass air flowing through the bypass duct.

As indicated in FIGS. 1 and 2, the outlet end of the bleed air duct, and thus the cover 65, is positioned along the outer wall of the core cowl 28, adjacent the IFS flow separation point 43. The position of the outlet 52 of the bleed air duct 50 and the cover 65 with respect to the IFS flow separation point 43 can be varied, based upon the diameter of the outlet 52, which regulates the amount of bleed air being exhausted from the bleed air duct 50, and the amount of protection required for the various components of the engine. For example, for engines in which lower cascade temperatures are particularly needed during reverse thrust operational modes, the cover 65 and outlet 52 can be positioned closer to the IFS flow separation point 43 to provide lower IFS or wall temperatures along the downstream portion of the bypass ducts. More specifically, the cover 65 and outlet 52 can be positioned downstream from the IFS flow separation point 43 by a distance greater than at least about 1 to about 2 times the diameter of the outlet end 52 of the bleed air duct 50.

Preferably, the bleed valve cover 65 of the present invention can be mounted along the inner fixed structure 31 of the bypass duct 32 downstream or aft of the IFS flow separation point 43 by a distance "x" shown in FIG. 2. This distance x is approximately 0.5 to about 2.5 times the diameter of the outlet end 52 of the bleed air duct 50. Such distance or spacing can be determined and set to optimize the reduction in bleed air temperature as it impinges upon the cascades during reverse thrust operation, and as the bleed air passes along the walls of the bypass duct or inner fixed structure of the engine if the valve 57 is open during a forward operation mode. It will be understood by those skilled in the art that the position of the bleed air cover of the present invention can be further adjusted with respect to the IFS flow separation point 43 for the bypass air as needed depending upon the size and configuration of the engine in which the bleed air relief system 11 of the present invention is being utilized. In addition, while the bleed air cover 65 of the present invention is illustrated as being mounted along the outer wall of the core cowl 28 or inner fixed structure, it is also possible to mount the cover 65 below the outer wall 29 of the core cowl 28, with the body 66 of the cover 65 projecting upwardly through an opening formed in the outer wall 29 of the core cowl 28 or inner fixed structure.

As illustrated in FIGS. 2-6, the cover 65 of the bleed air relief system of the present invention can include a diffuser 75 mounted within or formed across the upper surface 68 thereof. In a first embodiment, the diffuser can comprise a nozzle 76. The nozzle 76 can typically be a divergent nozzle as illustrated in FIGS. 3 and 4, which includes an upper outlet end 77, and can have a substantially conically shaped body 78 approximately about 0.7 to about 2.0 inches in axial length and which tapers inwardly and downwardly from the nozzle outlet end 77 to a lower or inlet end 79. Typically, the upper outlet end 77 of the nozzle can have a radius R1 (FIG. 3) ranging from approximately about 0.3 inches up to about 1.0 inches or greater depending upon the radius of the cover 65. The lower or inlet end 79 can have a radius of R2 of approximately about 0.1 to about 0.2 inches up to approximately about 0.5 inches or greater, with the size of the inlet opening varying depending upon the size of the cover and engine thrust rating. More particularly, in further embodiments, nozzles with a body having a height or length of approximately about 1.0 to about 2.0 inches and an outlet opening diameter of approximately about 0.7 to about 2.0 inches, can have an inlet opening diameter of approximately about 0.5 to about 1.0 inches.

Figure 6:
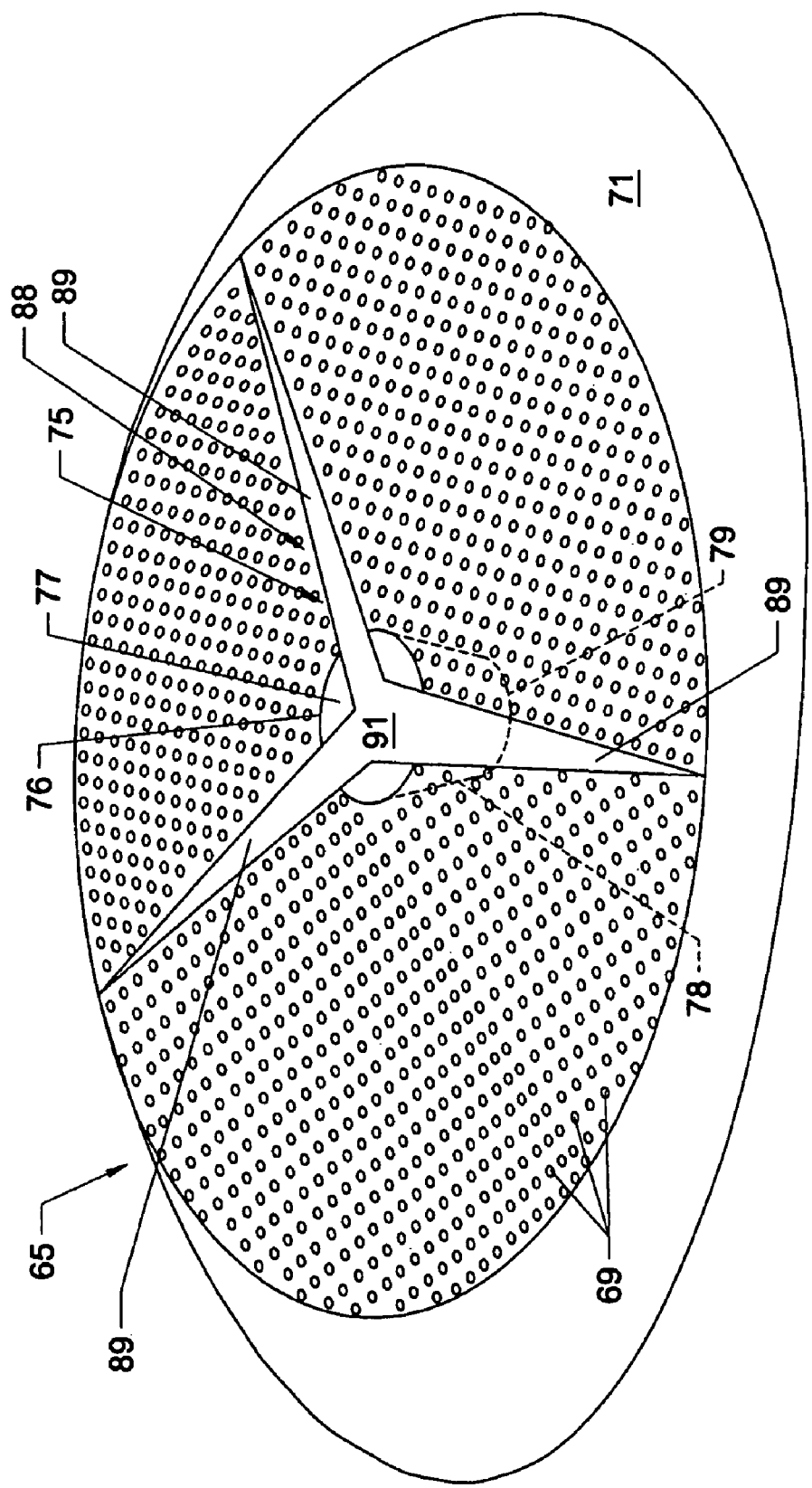
FIG. 6 is perspective illustration of another embodiment of the cover of the bleed air relief system of the present invention incorporating a diffuser nozzle and a blockage pattern.
Figure 7C:
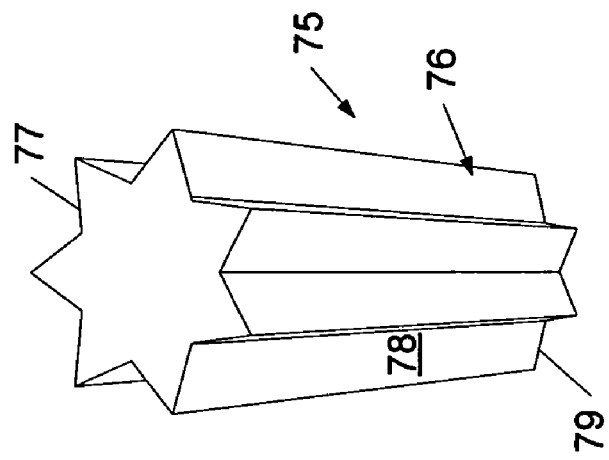
FIGS. 7A-7C are perspective illustrations of additional embodiments of nozzles for use in the bleed air relief system of the present invention.
Figure 7B:
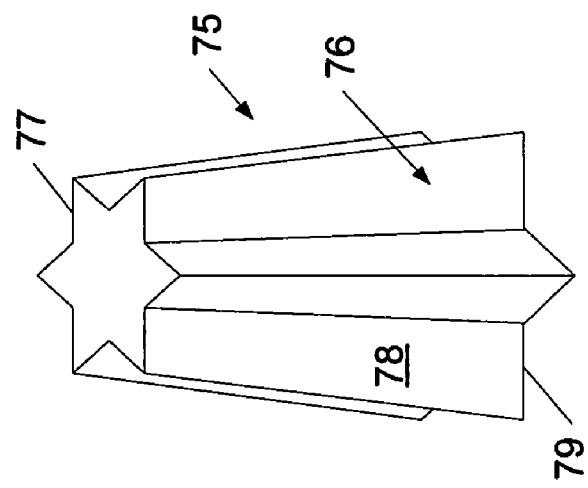
Figure 7A:
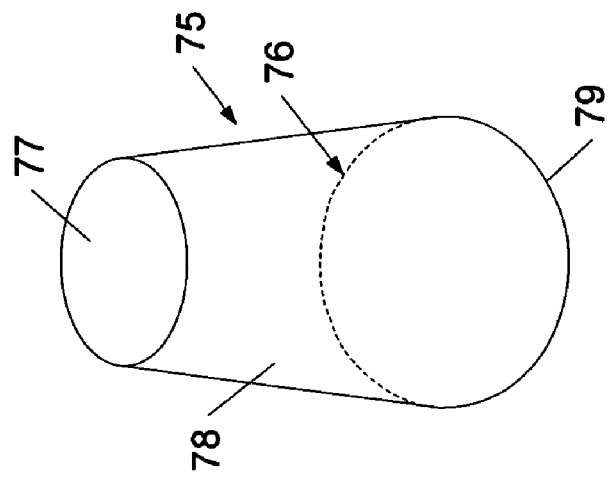

The nozzle 76 also can be formed in a variety of other configurations, including being formed as a converging nozzle as shown in FIGS. 7A-7B, wherein the lower or inlet opening 79 of the nozzle is of a larger size or diameter than its outlet opening 77, or substantially cylindrical (FIG. 6), with the inlet and outlet openings having an approximately equivalent diameter. Regardless of its specific configuration, however, the nozzle channels a portion of the bleed air flow through the center of the cover and creates a strong shear layer between the perforated cover bleed air flow and the nozzle flow. This shear layer increases turbulence, dissipates the energy of the bleed air jet and prevents the bleed air jet from crossing the fan duct and impinging on the cascade or translating sleeve.

As the high temperature, high pressure flow of bleed air exiting the outlet end 52 of the bleed air system 11 passes through the perforations 69 formed in the upper surface 68 of the cover 65, the perforations help to diffuse at least a portion of the bleed air flow as the bleed air flow is introduced into the bypass air stream. A portion of the bleed air passing through the cover also is received through the nozzle 76. As a result, a small amount or jet of a bleed air is passed through the center of the cover and into the lower energy bypass air stream at a different or changed velocity in relation to the remaining portions of the bleed air passing through the perforations in the upper surface of the cover. This can foster the turbulence within the lower velocity and lower temperature bypass air stream into which the higher temperature bleed air is being exhausted. Such turbulence or disruption of the airflows helps to facilitate the mixing of the higher temperature bleed air with the lower energy, lower temperature bypass air stream. This mixing can provide for improved heat transfer and thus the cooling of the bleed air by the bypass air stream.

Alternatively, to further enhance the mixing provided by the high speed air flow or jet passing through the nozzle, the nozzle can be formed with a convergent or divergent configuration such as shown in FIGS. 4A-4B, and 7A-7C. The outlet and/or inlet end of the nozzle 77 also can be formed with a round (FIGS. 4A and 7A), daisy (FIG. 4B), jagged (FIGS. 7B-7C), or other geometric or irregular shape, to cause further variation or change in the velocity and/or momentum of the jet of bleed air passing through the nozzle 77 in relation to the remaining portion of the flow of bleed air passing through the perforations 69 (FIG. 3) formed in the upper surface 68 of the cover 65. Still further, as illustrated in FIG. 3, a static pressure probe 81 can be mounted along the body 78 of the nozzle 76. The static pressure probe 81 can be positioned adjacent the outlet opening 77 of the nozzle 76, flush with the jet or flow of bleed air passing through the nozzle. A total pressure probe 82 can be positioned along the nozzle in a position normal to the bleed air flow through the nozzle. The pressure probes can measure or detect the static and total pressures of the bleed air jet as the bleed air passes through the nozzle. The detected pressures can be communicated to a control computer or system, such as the onboard computers for the aircraft on which an engine utilizing the bleed air relief system 11 of the present invention is mounted, to determine a pressure ratio of total pressure to static pressure measured by the probes 82 and 81.

If the engine bleed valve 56 is in a failed open state, the nozzle 75 of the subject invention can be running "chocked," with the bleed air jet passing therethrough at a known pressure ratio. For example, at a flow rate of Mach 1.0, the pressure ratio of total static to pressure will be approximately about 1.893, although such value can be lowered by as much as about 30% depending on the engine design. The calculated pressure ratio can be compared to a predetermined or programmed threshold pressure ratio. As the measured pressure ratio of total pressure to static pressure of the bleed air flow across the nozzle meets or exceeds the threshold level, the pilot can be signaled or provided with an indication that the engine bleed air valve is in a failed open condition and remedial action and servicing of the engine at the next stop will be required. The present invention thus can provide for early detection and warning of an engine bleed air valve in a failed open condition or state as early as possible to substantially minimize the amount of damage to which the engine may be subjected due to the failed open condition of the bleed air valve.

In an additional embodiment of the bleed air relief system of the present invention, the cover 65 can include a blockage pattern 85 extending across a portion of the entire diameter of the upper surface 68 of the cover. The blockage pattern 85 can be formed as a geometric pattern such as a four-pointed star 85 (FIG. 5A), six-pointed star 87 (FIG. 5B), a three-pointed star or triangular shape 88 (FIG. 6), or other patterns incorporating one or more non-perforated sections or segments 89. Each of these segments 89 generally will define a "bald patch" or area in which no perforations are formed through the upper surface of the cover. The blockage pattern 89 further will generally include a center portion 91 located approximately in the center of the upper surface of the cover 65. The blockage pattern 89 effectively splits the bleed air flow passing through the perforated upper surface of the cover 65 into separate quadrants to help reduce or change the velocity of the bleed air as it passes through the cover 65 and is introduced into the bypass air stream. As a result of the reduction in momentum or velocity of the bleed air due to the blockage pattern(s), the bleed air can readily mix with the lower temperature bypass air to facilitate the heat transfer between the bleed air and bypass air to enhance or speed up the reduction in temperature of the bleed air prior to its impinging or striking the cascades, translating sleeve, and/or inner walls of the bypass duct of the engine.

Still further, as illustrated in FIG. 6, a non-perforated blockage pattern also can be utilized in conjunction with a nozzle 76 that can be mounted to or formed on the upper surface of the cover 65. In such an embodiment, as illustrated in FIG. 6, a blockage pattern typically can at least partially overlap the outlet opening 77 of the nozzle 76. The limitation of the open area of the nozzle outlet 77 created by the blockage pattern 85 extending thereover, creates a high velocity jet or plume of bleed air that is at a different or higher velocity with respect to the remaining portions of the bleed air passing through the perforated quadrants or sections of the cover. Such portions of the bleed air passing through the perforated sections of the cover further can have a reduced momentum due to the effects of the blockage pattern thereon so as to further stimulate the mixing of the bleed air with the bypass air to enhance heat transfer and cooling of the bleed air as it enters and mixes with the bypass air stream.

In addition, while FIGS. 3 and 4 illustrate the use of a diffuser feature including a nozzle 76 that is integrally formed with the upper surface of the cover 65, it will be understood by those skilled in the art that it is also possible to utilize a separate nozzle that is mounted to the underside of the upper surface of the cover, or inserted at least partially through the upper surface of the cover, in open communication with an opening formed through the upper surface of the cover 65. For example, for retrofit applications, an opening can be formed in the upper surface of a conventional nozzle cover. A nozzle 76 could be mounted below the upper surface of the cover with the nozzle outlet in open communication with the opening formed in the upper surface of the cover. The nozzle 76 can be attached to the cover such as by welding, high temperature adhesive materials, fasteners, or other known methods. It is also possible to mount the nozzle within the opening formed in the upper surface of the cover by a shrink-fit type mounting operation. For example, the nozzle body could be treated with liquid nitrogen so as to cause contraction or a temporary reduction in size of the nozzle body, after which the nozzle can be inserted into the opening of the upper surface. As the nozzle body heats up, it will expand into tight, locking engagement with the opening of the upper surface so as to fixedly mount the nozzle therein.

The use of the cover of the present invention incorporating a divergent nozzle such as illustrated in the embodiments of FIGS. 3 and 4 can reduce the temperatures of the mixed bypass/bleed airflow at the cascades of an engine nearly 50° F., or more. To illustrate this temperature drop, a failed open condition of a bleed air valve can cause the introduction of bleed air temperature at an approximate spike temperature of 380° F. Using the a cover and divergent nozzle of the present invention may be able to reduce the temperature on the cascade or translating sleeve approximately 330° F. or lower. This reduction in temperature can significantly reduce the potential for degradation, IFS disbondment and delamination due to the impingement of high temperature air thereagainst, especially for extended periods of time.

It will be understood by those skilled in the art that while the foregoing has been described with reference to preferred embodiments and features, various modifications, variations, changes and additions can be made thereto without departing from the spirit and scope of the invention.

What is claimed is:

1. A cover for a bleed air relief system for introducing bleed air from a bleed air duct of a compressor of an engine into bypass air passing through an engine bypass duct, said cover comprising:

an upper surface having a series of flow openings formed therein and through which a first portion of the bleed air passes, said first portion having a first flow path; and a means on the surface of the cover for diffusing a second portion of the bleed air as it passes through said upper surface of said cover, the means having an inlet end spaced from and below the cover, said second portion of the bleed air having a second flow path to facilitate mixing of the bleed air and the bypass air to enhance cooling of the bleed air.

2. The cover of claim 1 and wherein said means for diffusing comprises a blockage pattern extending across said upper surface of said cover for splitting the flow of bleed air into separate portions having a reduced momentum.

3. The cover of claim 2 and wherein said blockage pattern comprises a plurality of blocking sections extending radially outwardly from a central portion of said upper surface of said cover.

4. The cover of claim 1 and wherein said means for diffusing comprises a nozzle mounted along said upper surface of said cover and having a nozzle body having an outlet at said upper surface and an inlet spaced from said outlet.

5. The cover of claim 4 and wherein said means for diffusing further comprises a blockage pattern extending across said upper surface of said cover, at least partially covering said outlet of said nozzle.

6. The cover of claim 4 and wherein said nozzle body has a length of approximately 1-2 inches and includes an inlet opening of a diameter less than or equal to said outlet opening.

7. The cover of claim 1 and wherein said means for diffusing comprises a substantially conically shaped divergent nozzle.

8. The cover of claim 1, wherein said means for diffusing comprises a nozzle having an outlet opening in said upper surface of said cover, and further comprising a series of pressure sensors mounted adjacent said outlet opening of said nozzle in a position to monitor pressures of the bleed air passing through said nozzle for determining a pressure ratio of the bleed air passing out of said outlet opening, to provide an indicator of a failed open condition of a bleed air valve when said pressure ratio exceeds a threshold level.

9. An engine bleed air relief system for mixing bleed air from the engine compressor with a bypass air stream passing through a bypass duct of the engine, the bleed air relief system comprising:
   a bleed air duct extending between an inlet at the engine compressor and an outlet located along the bypass duct, along which the bleed air is vented from the compressor;
   a bleed air valve positioned along said bypass duct for releasing a flow of bleed air from the engine compressor;
   a cover mounted over said outlet of said bypass duct, said cover comprising:
   an upper surface having a plurality of flow openings formed therethrough; and
   a diffuser having an inlet end spaced from and below the cover, and an outlet end on the upper surface of the cover;
      wherein as the flow of bleed air passes through said flow openings and said diffuser, the flow of bleed air is separated into a first portion and a second portion, with the first and second portions of the flow passing through said upper surface of said cover having different flow paths to enhance mixing of the bleed air with the bypass air and accordingly reduce the temperature of the bleed air.

10. The engine bleed air relief system of claim 9 and wherein the diffuser comprises a blockage pattern extending across said upper surface of said cover for splitting the flow of bleed air into separate portions.

11. The engine bleed air relief system of claim 9 and wherein the diffuser comprises a nozzle mounted along said upper surface of said cover and having a nozzle body having an outlet at said upper surface and an inlet spaced from said outlet.

12. A cover for a bleed air relief system for introducing bleed air from a bleed air duct of a compressor of an engine into bypass air passing through an engine bypass duct, said cover comprising:
   an upper surface having a series of flow openings formed therein and through which the bleed air passes; and
   a means for diffusing the bleed air as it passes through said upper surface of said cover to facilitate mixing of the bleed air and the bypass air to enhance cooling of the bleed air, wherein said means for diffusing comprises a nozzle having an outlet opening in said upper surface of said cover, and further comprising a series of pressure sensors mounted adjacent said outlet opening of said nozzle in a position to monitor pressures of the bleed air passing through said nozzle for determining a pressure ratio of the bleed air passing out of said outlet opening, to provide an indicator of a failed open condition of a bleed air valve when said pressure ratio exceeds a threshold level.

* * * * *